(12) United States Patent  
Choi

(10) Patent No.: US 6,908,294 B2  
(45) Date of Patent: Jun. 21, 2005

(54) APPARATUS FOR FORMING A LAYERED FIBROUS MAT OF VARIED POROSITY

(75) Inventor: Kyung-Ju Choi, Louisville, KY (US)

(73) Assignee: AAF-McQuay, Inc., Louisville, KY (US)

( * ) Notice: Subject to any disclaimer, the term of this patent is extended or adjusted under 35 U.S.C. 154(b) by 72 days.

(21) Appl. No.: 10/438,997

(22) Filed: May 15, 2003

(65) Prior Publication Data

US 2004/0053021 A1 Mar. 18, 2004

Related U.S. Application Data

(62) Division of application No. 09/635,310, filed on Aug. 9, 2000, now Pat. No. 6,596,205.

(51) Int. Cl.[7] ................................................ D01D 5/22
(52) U.S. Cl. ..................... 425/131.5; 425/363; 425/373; 425/382.2
(58) Field of Search ............................. 425/72.2, 131.5, 425/382.2, 363, 373, 374

(56) References Cited

U.S. PATENT DOCUMENTS

| 4,095,312 A | 6/1978 | Haley ......................... 19/308 |
| 4,100,324 A | 7/1978 | Anderson et al. ............ 428/288 |
| 4,267,002 A | 5/1981 | Sloan et al. ................. 156/276 |
| 4,375,446 A | 3/1983 | Fujii et al. ................... 264/518 |
| 4,526,733 A | 7/1985 | Lau ............................. 264/12 |
| 5,725,812 A | 3/1998 | Choi ............................ 264/6 |
| 5,891,482 A | 4/1999 | Choi ......................... 425/72.2 |
| 5,908,596 A * | 6/1999 | Wilkins et al. ............. 264/257 |
| 5,976,209 A | 11/1999 | Choi ........................... 55/482 |
| 5,976,427 A | 11/1999 | Choi ............................ 264/6 |

* cited by examiner

Primary Examiner—Benjamin L. Utech  
Assistant Examiner—Joseph S. Del Sole  
(74) Attorney, Agent, or Firm—Middleton Reutlinger

(57) ABSTRACT

An arrangement for producing a fibrous mat from a heated die source wherein the produced mat includes a first layered, preselected fiber portion of substantially straight fibers produced by directing such fibers directly to a collector source and a second layered preselected fiber portion of substantially curled fibers produced by diverting and exerting an external vertically creative curling force thereon before reaching the collector source.

21 Claims, 4 Drawing Sheets

APPARATUS FOR FORMING A LAYERED FIBROUS MAT OF VARIED POROSITY

This application is a divisional application of application Ser. No. 09/653,310, filed Aug. 9, 2000, and now U.S. Pat. No. 6,596,205.

BACKGROUND OF THE INVENTION

The present invention relates to a method, apparatus and product relating to fibrous mat and more particularly to a unique and novel arrangement for making fibrous mat in such a manner that the resulting spun fibrous layered mat has a controlled variable porosity. The present invention has particular applicability to polymer fibrous mat produced by melt blowing die apparatus but it is to be understood that the present invention can be readily utilized in layered mat production wherein fibrous mats of other fibrous materials in addition to preselected polymer material—such as glass— are extracted in die attenuated form from a heated die source unto a spaced collector source.

Layered fibrous mat composed of fibers attenuated from a heated die source unto a spaced layered mat collector surface are generally well known in both the glass and melt blown arts but none have utilized the unique and novel arrangement disclosed herein. Although, as above-noted, the present invention is not to be considered as limited to die spinning polymer materials from heated melt blown die sources, the unique and novel arrangement set forth herein has particular applicability in the melt blowing die spinning arrangements as disclosed in the U.S. Pat. No. 5,725,812, issued to Kyung-Ju Choi on Mar. 10, 1998; U.S. Pat. No. 5,891,482, issued to Kyung-Ju Choi on Apr. 6, 1999; U.S. Pat. No. 5,976,209, issued to Kyung-Ju Choi on Nov. 2, 1999; and, U.S. Pat. No. 5,976,427, issued to Kyung-Ju Choi, also on Nov. 2, 1999.

The external treatment of fibers with respect to a fiber collecting source is generally well known in the production of non-woven fabrics, attention being directed to U.S. Pat. No. 4,095,312, issued to D. J. Haley on Jun. 20, 1978 wherein fibers are collected from two fiber feeding sources to a pair of moving collecting surfaces to form a nip; to U.S. Pat. No. 4,100,324, issued to R. A. Anderson, et al. on Jul. 11, 1978, wherein wood pulp fibers are added to a matrix of collected polymeric melt blown micro fibers; to U.S. Pat. No. 4,267,002, issue to C. H. Sloan on May 21, 1981, wherein fibers are formed in elongated rod shape with a heavy build-up in a central portion and a light build-up in a lip portion folded back over the central portion; to U.S. Pat. No. 4,375,466, issued to S. Fujii, et al. on Mar. 1, 1983, wherein melt blown fibers are collected in a valley-like fiber-collecting zone formed by relatively moveable and compressible porous plates which have a controlled number of pores; and, finally to U.S. Pat. No. 4,526,733, issued to J. C. Lau on Jul. 2, 1955, wherein a fluid stream of attenuated fibers is preselectively temperature treated upon exiting die tip orifices to provide improved collected web properties.

Although these above-noted patents disclose various external treatments of fiber streams attenuated from heated die sources, none teaches or suggests, either alone or in combination, the economical and straight-forward arrangement which includes the novel diversion and vortically creating force exertion of a selected portion of fiber streams to provide a selected variable porosity of the total fibrous mat as it passes to a fiber collecting source.

The present invention provides a unique and novel die attenuated fiber arrangement including a straight-forward, economical and inventively unified production method, apparatus and final layered fibrous mat product which allows for efficient and economic control of the porosity of a layered fibrous mat product which can have a selected variable density and porosity. The present invention accomplishes the unique features thereof with a minimum of apparatus parts and method steps in both manufacture and maintenance and, at the same time, allows for ready adjustment to control variable mat density and porosity in selected areas of a produced fibrous mat.

Various other features of the present invention will become obvious to one skilled in the art upon reading the disclosure set forth herein.

BRIEF SUMMARY OF THE INVENTION

More particularly the present invention provides a unique and novel method, apparatus and product arrangement in the production of die attenuated fibrous mat which can be utilized in any number of commercial environments—one of which is the fluid filtration art.

Specifically, the present invention provides a method of forming a web of fibrous media comprising: feeding fibers in attenuated multiple fibers sheet form from spaced heated die orifice sources in a feed path toward a spaced longitudinally extending collector source to be layered on the longitudinally extending collector source in successive lower and upper fiber layers; and, exerting an external vertically creating force at a selectively spaced location on at least a portion of the multiple fibers sheet in the feed path of the sheet as that portion and the remaining portion of the multiple fibers sheet approach the collector source with both portions forming on the collector source with the greatest fiber porosity of the formed layers of fibers on the longitudinally extending collector source being along those fibers of that portion of the multiple fibers sheet exposed to the external vortically creating force.

In addition, the present invention provides apparatus for manufacturing a fibrous mat comprising: spaced, heated die orifices source capable of spinning at least one attenuated multiple spaced fibers sheet; a spaced longitudinally extending collector surface adapted to eventually receive the totality of the multiple spaced fibers sheet to form a fibrous mat thereon; and a gap spaced fiber deflection or diverting apparatus positioned externally of the heated die orifices source to deflect or divert and apply a vortically creating deflecting or diverting force to a portion of the multiple spaced fibers sheet and to then combine the loosely bonded, deflected or diverted, responsive portion on the collector source with the remainder of the attenuated multiple fibers spun as at least one multiple spaced fibers sheet from the heated die source.

Further, the present invention provides a mat of fibrous media comprising at least a first portion of selected fiber diameter and at least a second portion also of selected fiber diameter, the first portion being of substantially aligned fibers of a first comparatively lower porosity and higher density spun from a die source directly to a collector source and the second portion being of substantially curled external force treated fibers of a second comparatively higher porosity and lower density than the first portion due to the external vertically creating force treatment before arriving at the same collector source to combine with the first higher density portion of the fibers in forming the fibrous mat.

It is to be understood that various changes can be made by one skilled in the art in the several parts and the several steps of the novel method and apparatus disclosed herein and in the novel fibrous mat also disclosed herein without departing from the scope or spirit of the present invention. For example, the spacing and number of dies, the spacing and type of collector surfaces utilized, the location and structure of the fiber vortically creating, force deflection arrangement and the nature of the fibrous material—each, or all, can be modified without departing from the scope or spirit of the present invention.

BRIEF DESCRIPTION OF THE DRAWINGS

Referring to the drawings which schematically disclose one advantageous embodiment of the present invention:

FIG. 4 illustrating a sloping, static, vortically creating deflector capable of feeding fibers from a heated die fiber source unto the gap-spaced collector surface; and, FIG. 5 illustrating still a further static, vertically creating, deflector or diverter arrangement gap-spaced from the collector surface with a chopped fiber feed supply source; and, FIG. 6 represents a further modified schematic illustration, disclosing an endless belt elongated collector surface spaced from a heated die fibers source and having a gap-spaced, vortically creating deflector surface such as is disclosed in FIG. 1.

DETAILED DESCRIPTION OF THE DRAWINGS

Figure 1:
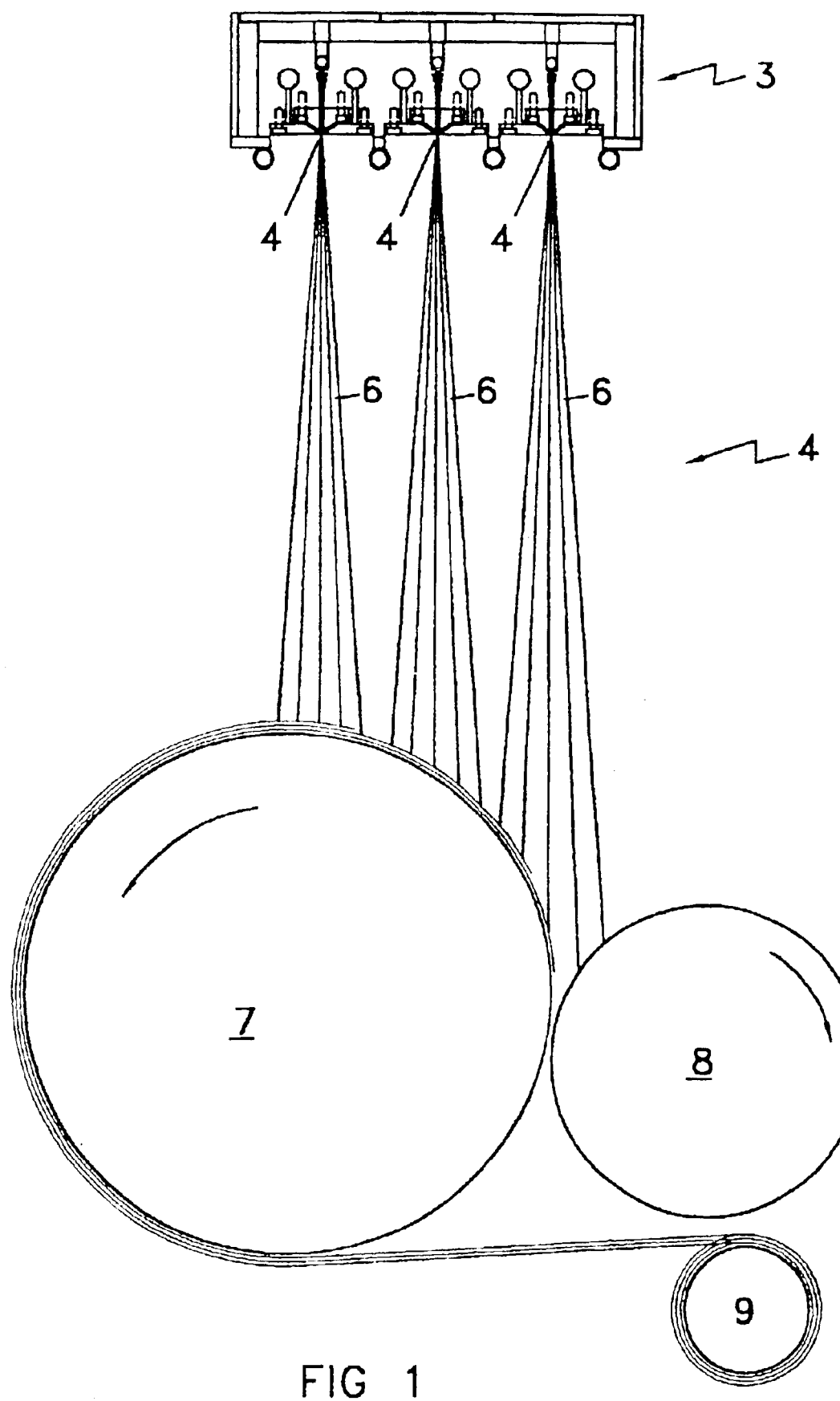
FIG. 1 is a schematic, vertical plan view of one type of heated die source employable in the present invention to attenuate multiple fiber layers to a spaced drum-like collector surface and a drum-like vortically creating force deflector surface gap spaced from the drum-like collector surface and being of smaller diameter than the drum-like collector surface and rotated in an opposite direction to apply a highly turbulent, vortically creating deflecting force to a portion of the multiple fiber layers before such vertically created deflected portion collects with the remainder of the multiple fiber layers which are fed directly to the collector surface.

Referring to FIG. 1 of the drawings, one novel overall embodiment 2 of the present invention is disclosed for forming a layered web of fibrous media in accordance with the unique arrangement as is described hereinafter. This arrangement includes a heated die source 3 having a plurality of spaced die orifices 4 capable of dispensing multiple spaced fibers layers 6 in feed paths toward a spaced longitudinally extending collector source 7. The heated die source 3 can be anyone of a number of melt blown die arrangements known in the spaced fiber forming melt blown die art, such as can be found in one or more of the several patents above noted. It is to be understood that the present invention is not to be considered as limited to the melt blown heated die source disclosed herein—which is generally known for dispensing multiple spaced fiber layer 6 of polymer fibrous materials but, that other heated die arrangements such as those utilized to attenuate spaced glass fibers sheets can also be utilized. Advantageously, the die source 3 described herein can dispense polymer spaced fibers mats including several spaced rows of fibers with each row baying at least approximately thirty (30) spaced fibers per approximately two point five (2.5) centimeters with each of the fiber diameters being in the range of zero point three (0.3) to twenty-five (25) microns and advantageously being approximately three point five (3.5) microns. A first portion of the multiple spaced fibers 6 are directly attenuated in straight fibers form to a moveable collector source 7, the outer peripheral surface of which is preselectively spaced from heated die source 3 a distance an the range of two point five (2.5) to one hundred (150) centimeters and advantageously a distance of approximately thirty (30) centimeters. A moveable longitudinally collecting surface in the form of a rotatable drum is disclosed in FIG. 1 of the drawing with three (3) spaced multiple fiber layers 6 being attenuated from the heated melt blown die source 3 unto collector source 7. In the drawing disclosed, two of the three spaced multiple spaced fibers 6 are directly attenuated to the rotatable drum collector source 7 in straight fibers form and a portion of the third spaced multiple spaced fiber 6 on the right side of the drawing is directed to a moveable diverting and external farce 8. It is to be understood that the fibers from each die row can be comparatively varied in cross-section; i.e., the fibers in one die row being comparatively fine, in an adjacent row comparatively medium, and in still a further adjacent row being comparatively course. Collector source 7 and external vortically creating deflective or diverting force S can be in the form of relatively parallel, spaced longitudinally extending rotatable drums 7 and 8, with drum 7 having a larger diameter than vortically creating deflecting or diverting drum 8 (having a curved surface). Drums 7 and 8 can be rotated in opposite directions by suitable drive and gearing mechanisms (not shown). The peripheral surface of longitudinally extending drum S can be gap-spaced from the peripheral surface of larger drum 7 in a spacing range of approximately zero point twenty-five (0.25) to fifteen (15) centimeters and advantageously a spacing of approximately zero point four eight (0.48) centimeters. Accordingly, when a preselected, portion of fibers of a multiple fibers mat are diverted to smaller diameter rotating drum 8, rotating in a direction opposite the rotation of drum 7, and at a different speed than drum 8, stress is placed on such diverted fibers. This comparatively small diversion of fibers at different speeds exerts an external, vortically creating, venturi-like force on such spaced fibers causing the same to curl before returning such fibers to collector source rotating drum 7, thus, forming an upper layer of fibers on drum 7 of greater porosity than the directly attenuated fibers from heated die source 3. The total of the multiple fibers mats are then subsequently inverted and moved to a rotatable mat collecting source 9. Mat collecting source 9 can also be in the farm of a substantially parallel, longitudinally extending drum rotated at a selected speed determined by the relative diameter size and speed of collector drum 7.

Figure 2:
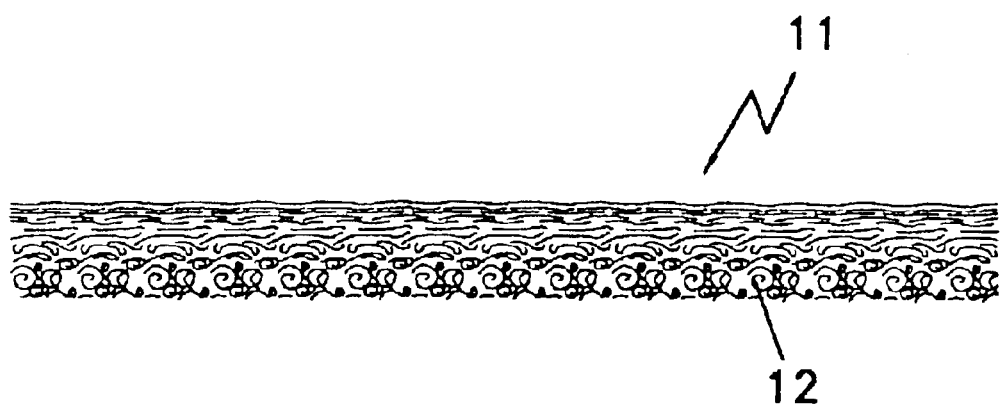
FIG. 2 is a schematic, cross-section of a portion of a novel fibrous mat produced on a novel apparatus such as disclosed in FIG. 1, this figure disclosing the low porosity, high density upper layer portion and the vortically created, curled form lower layer with higher porosity and lower density than the upper layer portion.
Figure 3:
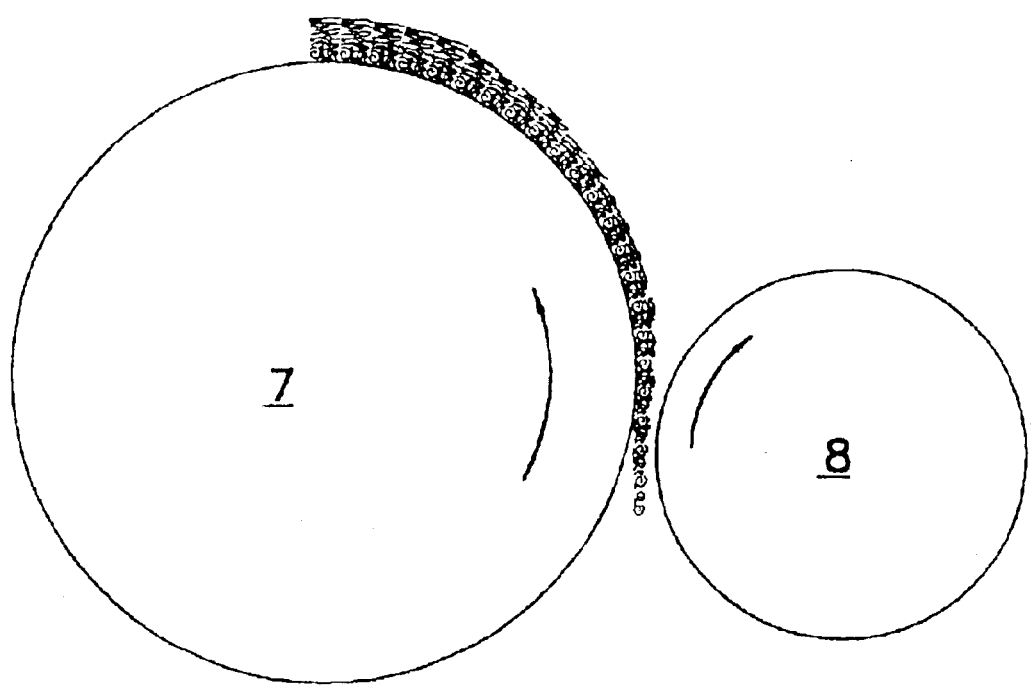
FIGS. 3–5 represent schematic illustrations of a drum-like collector surface with three types of collector surface gap spaced cooperative, vortically creating deflector arrangements—FIG. 3 being similar to the novel arrangement of FIG. 1.

Referring to FIG. 2 of the drawings, the schematic cross-section of a portion of a novel fibrous filter mat 11 removed from mat collector source 9 is disclosed. It is to be noted that the lower layers of this mat 11 are of a curled nature 12, having been subjected to the diverting and external vertically creating, venturi-like force in the form of gap-spaced, smaller diameter, longitudinally extending oppositely rotating drum 8 (FIGS. 1 and 3). Advantageously, lower layer 12, as shown, comprises approximately two thirds (⅔) of the total thickness cross-section of filter mat 11. It is to be understood that the amount of diverted, spaced fibers material and the location thereof in a mat produced in accordance with the features of the present invention can be selectively varied to meet the desired layer parameters established for a particular use thereof.

Figure 4:
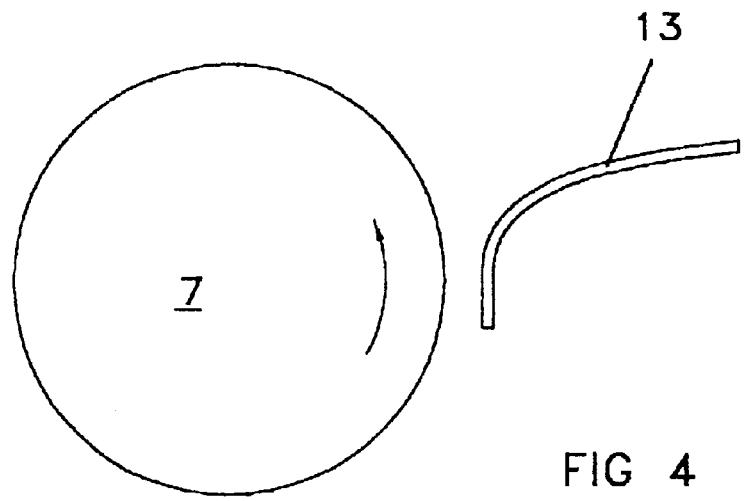
Figure 5:
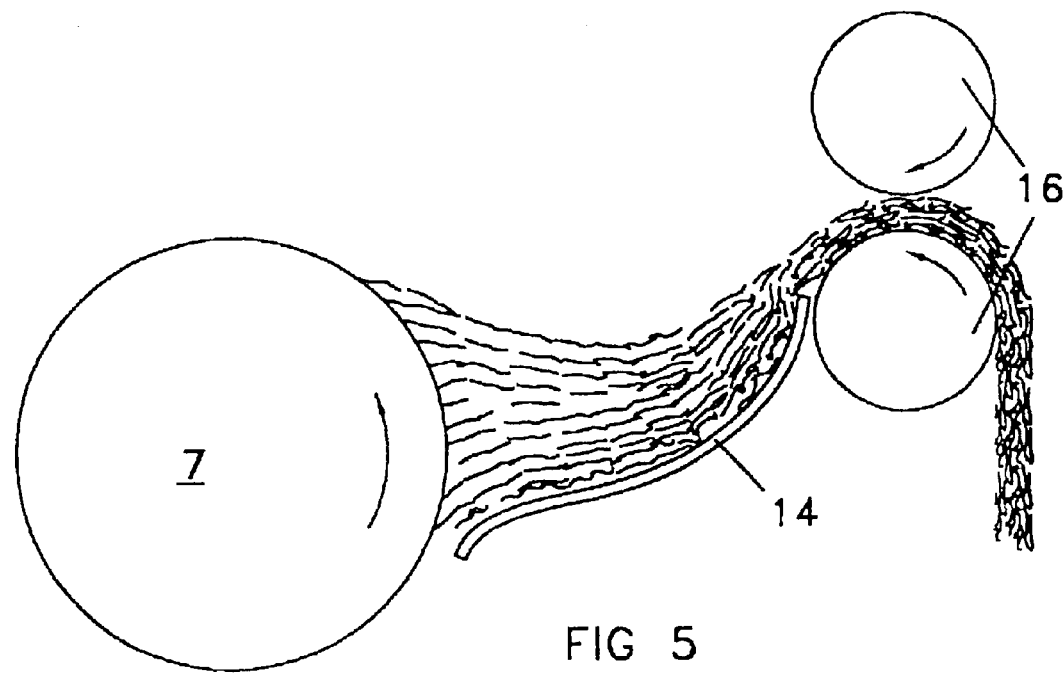

Referring to FIGS. 4 and 5, further inventive modifications of the apparatus of FIGS. 1 and 2 are illustrated. in FIG. 4. the diverting and external force is disclosed in cross-section as a slopingly curved, static vortically creating fibers diverter 13 in gap-spaced cooperation with longitudinally extending, relatively movable collector drum 7; and, in FIG. 5, the diverting and external force is disclosed in cross-section as a slopingly bidirectional curved static, vortically creating fibers diverter 14 similar to static fibers diverter 13 so as to be in gap-spaced vortically creating cooperation with longitudinally extending collector drum 7. Sloping diverter 14 also is shown in FIG. 5 to be in cooperation at an opposite extremity with a further fibers Supply feed source 16. It is to be understood that the fibers disposed in supply feed source 16 can be of a chopped or crimp fibers nature and of the same or preselectively different fibrous material.

Figure 6:
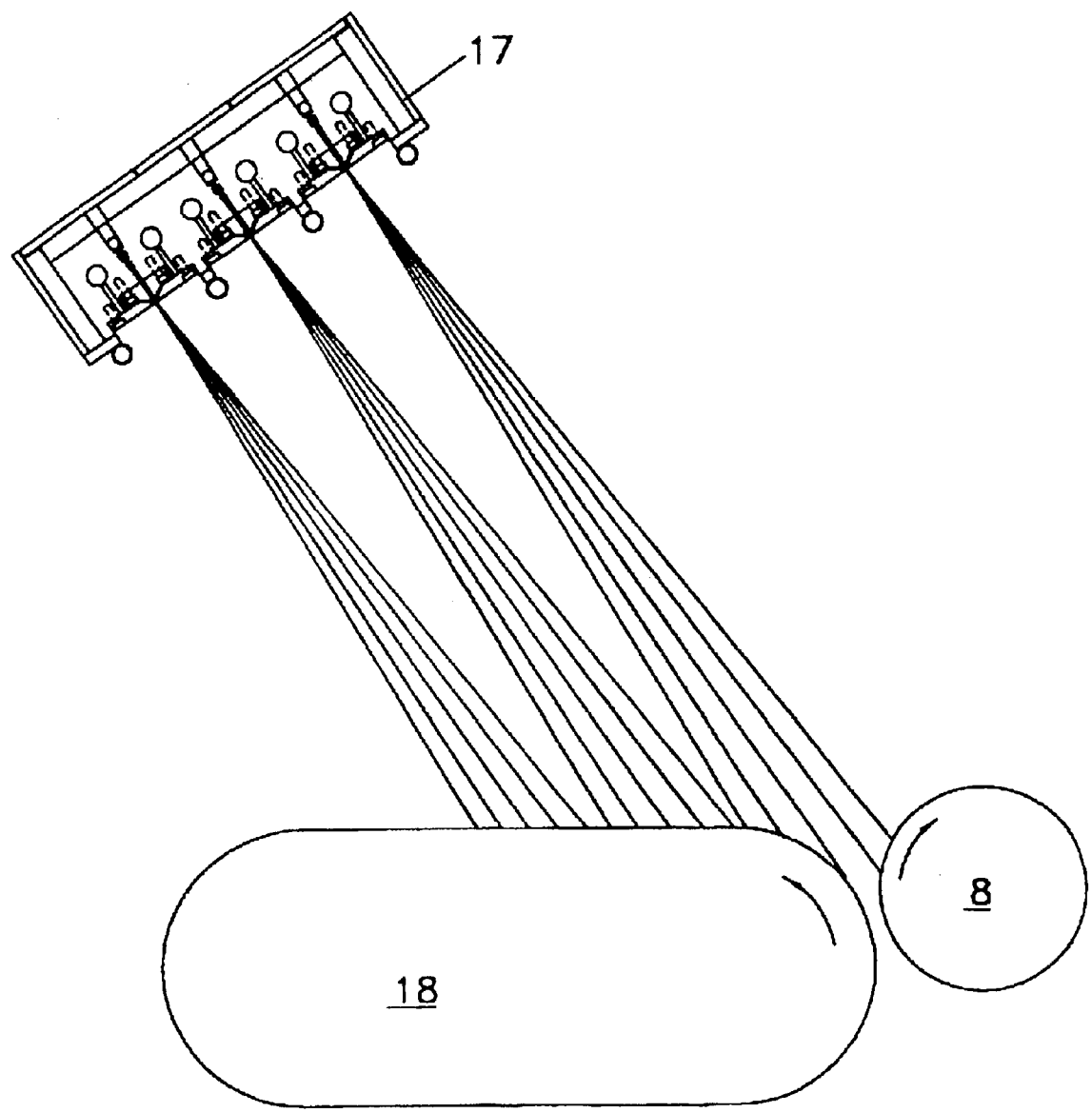

In FIG. 6, still a further embodiment of the present invention is disclosed. In this figure, heated die fibers source 17, similar to that previously described is illustrated as positioned at an inclined angle so as to direct attenuated multiple fibers sheets toward a longitudinally extending moveable endless belt 18 spaced a preselected distance from die source 17. Diverting and external vortically creating force drum 8 of smaller surface than belt 8 and gap-spaced a preselected distance therefrom, moves in an opposite direction from endless belt 8 to exert an external vortically creating force on a preselected portion of the multiple fibers sheet before that portion is returned to endless belt 18 to join the remaining portions of the multiple spaced fibers sheets from furnace 17.

In a typical inventive operation of the aforedescribed inventive apparatus multiple fibers are attenuated from a preselectively spaced heated fibers die source 3 in multiple fibers mats, each layer including spaced rows of spaced fibers of at least thirty (30) fibers per approximately two point five (2.5) centimeters with the fiber diameters advantageously being approximately three point five (3.5) microns. Selectively, a first approximately two thirds plus portion of the total fiber thickness of a formed mat are directed directly toward a first spaced longitudinally extending movable collector source which is spaced from the heated die source 3 approximately thirty (30) centimeters to be directly layered on the longitudinally extending movable collector source. At the same time, a second external vortically creating, venturi-like diverter force is exerted selectively on an approximately the remaining second portion of the fibers from the heated die fibers source, the second vertically creating, venturi-like diverter force, which, if moveable, can be moved at a different speed than drum 7 with the perimeter surface of the diverter creating force being gap-spaced from the peripheral surface of parallel drum 7 approximately zero point four eight (0.48) centimeters to thus curl a two-thirds (⅔) thickness portion of a layered mat of more porous fibers when such fibers are returned to the collector source in the form of rotatable drum 7 and subsequently, invertedly passed to mat collector source 9 with the removed inverted mat 11 (FIG. 2) having the lower two-thirds (⅔) thickness portion of greater porosity than the upper greater density and less porosity portion layers (FIG. 2).

Thus, as can be seen in FIG. 2, a novel fibrous mat of layered form is provided selectively comprising the lower approximately two thirds (⅔) plus thickness portion of porous fibers layers and the remaining, upper portion of less porous and higher density layers, the thickness of the layered fibrous mat with the fibers of both portions being approximately three point five (3.5) microns in average diameter and with the fibers of the one portion having been attenuated directly from a die source to form inverted mat, upper layers of the fibrous mat of lesser porosity than the fibers of the lower layered remaining fibers portion which have been diverted and subjected to an external, vortically creating force to form the lower layers of the inverted mat in curled form with greater porosity than the denser and less porous upper layers.

It is to be understood that the gradient density and the fiber cross-sectional size can be selectively varied by one skilled in the art in accordance with the present invention to meet particular demands of a particulate laden fluid stream to be treated.

What is claimed is:

1. Apparatus for manufacturing a fibrous mat comprising: a heated die source including spaced die orifices capable of spinning attenuated multiple fibers as at least one attenuated multiple fiber layer; a gap spaced longitudinally extending collector surface adapted to eventually receive the totality of said multiple fiber layer to form a fibrous mat thereon; a curved fiber diverter positioned externally of said heated die source and said collector surface to apply an external vortically creating force to a portion of said attenuated multiple fibers and then combine said portion on said collector surface with the remainder of said attenuated multiple fibers spun as at least one multiple fiber layer from said heating die source.

2. The apparatus for manufacturing a fibrous mat of claim 1, said die source being a melt blown heated die source.

3. The apparatus for manufacturing a fibrous mat of claim 1, said die source being a heated glass die source.

4. The apparatus for manufacturing a fibrous mat of claim 1, said collector surface being a rotatable longitudinally extending collector drum.

5. The apparatus for manufacturing a fibrous mat of claim 1, said collector surface being a moveable endless belt.

6. The apparatus for manufacturing a fibrous mat of claim 1, said collector surface moving in a first direction and said curved fiber diverter positioned externally of said die source moving in a second direction, said first direction being different than said second direction.

7. The apparatus for manufacturing a fibrous mat of claim 4, said directionally modified diverting force being a longitudinally extending rotatable drum being of lesser selected diameter than said rotatable longitudinally extending collector drum and selectively rotatable at a differing speed from the selective rotation of said collector drum.

8. The apparatus for manufacturing a fibrous mat of claim 1, said curved fiber diverter being relatively statically positioned to deflect and return said portion of said attenuated multiple fibers to said collector surface.

9. The apparatus for manufacturing a fibrous mat of claim 8, said curved fiber diverter having a bidirectional curved contour with a first end in cooperation with a fiber supply feed source and a second end in cooperation with said collector surface, said curved fiber diverter directing a plurality of chopped fibers received from said fiber supply feed source unto said collector surface.

10. The apparatus for manufacturing a fibrous mat of claim 1, wherein the gap space between said heated die source and said collector surface is in the approximate range of thirty (30) centimeters and a gap space between said curved fiber diverter and said collector surface in the approximate range of zero point twenty five (0.25) to fifteen (15) centimeters.

11. The apparatus of manufacturing a fibrous mat of claim 1, wherein the gap space between said heated die source and said collector surface is advantageously approximately thirty (30) centimeters and the gap space between said curved fiber diverter and said collector surface is advantageously approximately zero point four eight (0.48) centimeters.

12. Apparatus for forming a layered web of porous media wherein adjacently facing layers of fibrous media are separate from each other comprising: a heated die source including spaced rows of fiber spaced orifices with each row advantageously having a selected number of die openings per selected distance capable of forming attenuated fibers, each with an orifice diameter selected to produce a specific fiber diameter; a longitudinally extending movable collector first member advantageously spaced from said heated die source a selected distance to collect in layers as a first portion of a fibrous mat; and a longitudinally extending vortically creating second member having a curved surface and gap spaced from said first moveable member a selected second distance sufficient to divert and exert a vortically creating force on a second portion of the fibers from the heated die source before returning such diverted fibers in curled form as layers on said first member with a greater porosity than the fibers of said first potion forming said fibrous mat.

13. The apparatus of claim 12, wherein said first and second members are relatively movable to each other.

14. The apparatus of claim 12, wherein said first member comprises a first rotatable drum and said second member comprises a second rotatable drum and said second member comprises a second rotatable drum of lesser diameter than said first drum and rotatable in an opposite direction.

15. The apparatus of claim 12, wherein said first member comprises a longitudinally extending endless belt and said second member comprises a rotatable drum movable in an opposite direction.

16. The apparatus of claim 12, wherein said second member is static.

17. The apparatus of claim 12, wherein said heated die source is comprised advantageously of thirty (30) die openings per approximately two point five (2.5) centimeters.

18. The apparatus of claim 12, wherein said fiber diameter is approximately three point five (3.5) microns.

19. The apparatus of claim 12, wherein said heated die source is spaced from said first member approximately thirty (30) centimeters.

20. The apparatus of claim 12, wherein said second member is gap-spaced from said first movable member an advantageous distance of approximately point four eight (0.048) centimeters.

21. Apparatus for forming a layered web of fibrous media mat wherein adjacent layers of fibrous media are distinctly separate from each other comprising: a heated die source including at least two spaced rows of fiber spaced orifices having at least thirty (30) die opening per two point five (2.5) centimeters capable of forming attenuated fibers each with a diameter of approximately three point five (3.5) microns; a longitudinally extending first collector drum advantageously spaced from said heated die source a distance of approximately thirty (30) centimeters to directly collect layers as a first portion of fibrous media comprising a denser, less porous one third thickness portion of such fibrous mat; a second longitudinally extending collector drum of smaller diameter than said first drum and rotatable in an opposite direction therefrom, said second drum being gap-spaced from said first drum a distance of approximately zero point four eight (0.48) centimeters to divert and receive a second portion of said mat and return in vortically creating form said second portion to said first collector drum so as to constitute approximately a curled, more porous, less dense two thirds thickness portion of said fibrous mat of said formed layered web of fibrous media.

\* \* \* \* \*